(12) United States Patent
Zhao et al.

(10) Patent No.: US 10,089,944 B2
(45) Date of Patent: Oct. 2, 2018

(54) ARRAY SUBSTRATE AND DISPLAY DEVICE FOR REDUCTION OF PERIPHERAL RESIDUAL IMAGES, AND DRIVING METHOD THEREOF

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Jian Zhao, Beijing (CN); Xuebing Jiang, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei (CN)

( * ) Notice: Subject to any disclaimer, the term of this patent is extended or adjusted under 35 U.S.C. 154(b) by 0 days.

(21) Appl. No.: 15/521,052

(22) PCT Filed: Oct. 25, 2016

(86) PCT No.: PCT/CN2016/103246
§ 371 (c)(1),
(2) Date: Apr. 21, 2017

(87) PCT Pub. No.: WO2017/113958
PCT Pub. Date: Jul. 6, 2017

(65) Prior Publication Data
US 2018/0107081 A1   Apr. 19, 2018

(30) Foreign Application Priority Data
Dec. 31, 2015  (CN) .......................... 2015 1 1031927

(51) Int. Cl.
G02F 1/1368   (2006.01)
G09G 3/36   (2006.01)
G02F 1/1362   (2006.01)

(52) U.S. Cl.
CPC ......... G09G 3/3611 (2013.01); G02F 1/1368 (2013.01); G02F 1/136209 (2013.01);
(Continued)

(58) Field of Classification Search
CPC ....... G09G 2320/02; G09G 2320/0257; G09G 3/3655; G09G 2320/0266; G09G 3/36–3/3696; G02F 1/136286
See application file for complete search history.

(56) References Cited

U.S. PATENT DOCUMENTS 8,411,240 B2    4/2013  Harada et al.
2010/0238135 A1*  9/2010  Brown .................. G06F 3/0412
                                               345/175

FOREIGN PATENT DOCUMENTS

CN    102054454 A    5/2011
CN    104297977 A    1/2015
(Continued)

OTHER PUBLICATIONS

International Search Report and Written Opinion dated Jan. 25, 2017; PCT/2016/103246.

*Primary Examiner* — Larry Lee
(74) *Attorney, Agent, or Firm* — Ladas & Parry LLP (57) ABSTRACT

An array substrate, a display device and a driving method thereof. Gate-line extension lines, data-line extension lines and a control circuit are disposed in a peripheral area of the array substrate. The control circuit is configured to connect the gate lines to the gate-line extension lines and connect the data lines to the data-line extension lines in a time period of displaying an image, and configured to disconnect the gate lines from the gate-line extension lines, disconnect the data (Continued)

lines from the data-line extension lines, control at least part of the gate-line extension lines to have potential difference, and control at least part of the data-line extension lines to have potential difference in a time period between displaying two adjacent images.

19 Claims, 7 Drawing Sheets

(52) U.S. Cl.
CPC ... *G09G 3/3655* (2013.01); *G09G 2320/0257* (2013.01); *G09G 2320/0266* (2013.01)

(56) References Cited

FOREIGN PATENT DOCUMENTS

| | | |
|---|---|---|
| CN | 204667021 A | 9/2015 |
| CN | 105487312 A | 4/2016 |
| JP | 2013003223 A | 1/2013 |

* cited by examiner

| in a time period of displaying an image, connecting gate lines to gate-line extension lines, and connecting data lines to data-line extension lines in response to a first control signal | S901 |

| in a time period between displaying two adjacent images, disconnecting the gate lines from the gate-line extension lines and disconnecting the data lines from the data-line extension lines in response to a second control signal, and controlling two adjacent rows of the gate-line extension lines to have potential difference and controlling two adjacent columns of the data-line extension lines to have potential difference in response to a third second control signal | S902 |

Fig. 9

ARRAY SUBSTRATE AND DISPLAY DEVICE FOR REDUCTION OF PERIPHERAL RESIDUAL IMAGES, AND DRIVING METHOD THEREOF

TECHNICAL FIELD

Embodiments of the present disclosure relate to an array substrate, a display device and a driving method thereof.

BACKGROUND

Currently, display technologies have been widely applied, and display devices used for displaying images are many and varied, and can display various images. With the rapid development of flat-panel display technologies, the demand for the image quality of the display devices is increasing.

Image residual is an important factor to evaluate the image quality, and has aroused wide attention for a long time. For a display device, for example, a liquid crystal display panel, in the case that one image being displayed for a long time, because of the long time effect of the electric field, an afterimage may occur when switching to other images. The main reasons for the occurrence of the image residual is as follows: charged ions will be introduced in the display device during manufacturing processes of the display device and material, and in the case that one image being displayed for a long time, the above charged ions will be separated under the external electric field, and therefore an internal electric field is formed. The internal electric field formed by the above charged ions makes the display device maintain the last image when switching to other images and therefore the afterimage occurs.

Peripheral image residual is one type of image residual that often occurs in the display device. The main reasons for the occurrence of the peripheral image residual include: contamination of the liquid crystal molecules inside the LCD panel is caused by the sealant disposed at the peripheral area of the LCD panel, charged ions caused by the contamination are distributed at the peripheral area of the LCD panel, an internal electric field is formed by the charged ions during the display device displaying an image, the internal electric field formed by the above charged ions makes the display device maintain the last image when switching to other images, and therefore the peripheral image residual occurs.

Therefore, the peripheral image residual issue of the display device needs to be solved.

SUMMARY

Embodiments of the present disclosure provide an array substrate, a display device and a driving method thereof. The peripheral image residual issue can be effectively solved, and the display quality of the display device can be improved.

Embodiments of the disclosure provide an array substrate, comprising: a substrate; a plurality of gate lines and a plurality of data lines, the plurality of gate lines and a plurality of data lines intersecting with each other and disposed on the substrate; a control circuit; a plurality of gate-line extension lines, which are connected with at least part of the gate lines through the control circuit; and a plurality of data-line extension lines, which are connected with at least part of the data lines through the control circuit; where the control circuit is configured to connect the gate lines to the gate-line extension lines and connect the data lines to the data-line extension lines in a time period of displaying an image, and the control circuit is configured to disconnect the gate lines from the gate-line extension lines, disconnect the data lines from the data-line extension lines, control at least part of the gate-line extension lines to have potential difference, and control at least part of the data-line extension lines in a time period between displaying two adjacent images.

For example, in the array substrate provided in embodiments of the disclosure, the gate-line extension lines are respectively provided at two ends of respective gate lines and have a one-to-one correspondence with the gate lines, and the data-line extension lines are respectively provided at two ends of respective data lines and have a one-to-one correspondence with the data lines.

For example, the array substrate provided in embodiments of the disclosure comprises a display area and a peripheral area surrounding the display area, where the gate lines and the data lines are disposed in the display area, the gate-line extension lines, the data-line extension lines and the control circuit are disposed in the peripheral area.

For example, in the array substrate provided in embodiments of the disclosure, the control circuit is configured to disconnect the gate lines from the gate-line extension lines, disconnect the data lines from the data-line extension lines, control two adjacent rows of the gate-line extension lines to have potential difference, and control two adjacent columns of the data-line extension lines to have potential difference in the time period between displaying two adjacent images.

For example, in the array substrate provided in embodiments of the disclosure, the control circuit comprises a first control circuit and a second control circuit. The first control circuit is configured to connect the gate lines to the gate-line extension lines and connect the data lines to the data-line extension lines in the time period of displaying an image, and configured to disconnect the gate lines from the gate-line extension lines and disconnect the data lines from the data-line extension lines in the time period between displaying two adjacent images. The second control circuit is configured to control the adjacent rows of the gate-line extension lines to have potential difference and control the two adjacent columns of the data-line extension lines to have potential difference in the time period between displaying two adjacent images.

For example, in the array substrate provided in embodiments of the disclosure, the first control circuit comprises a first switching thin-film transistor and a second switching thin-film transistor. The first switching thin-film transistor is configured to connect a corresponding gate line to a corresponding gate-line extension line in the time period of displaying an image, and disconnect the corresponding gate line from the corresponding gate-line extension line in the time period between displaying two adjacent images; and the second switching thin-film transistor is configured to connect a corresponding data line to a corresponding data-line extension line in the time period of displaying an image, and disconnect the corresponding data line from the corresponding data-line extension line in the time period between displaying two adjacent images.

For example, in the array substrate provided in embodiments of the disclosure, a source electrode of the first switching thin-film transistor is connected with the corresponding gate-line extension line, a drain electrode of the first switching thin-film transistor is connected with the corresponding gate line, and a gate electrode of the first switching thin-film transistor is configured to be inputted with a first voltage signal; a source electrode of the second switching thin-film transistor is connected with the corresponding data-line extension line, a drain electrode of the second switching thin-film transistor is connected with the corresponding data line, and a gate electrode of the second switching thin-film transistor is configured to be inputted with a second voltage signal.

For example, in the array substrate provided in embodiments of the disclosure, the second control circuit comprises a third switching thin-film transistor and a fourth switching thin-film transistor. The third switching thin-film transistor is configured to control a corresponding gate-line extension line at an alternate row to be in a high voltage state in the time period between displaying two adjacent images; and the fourth switching thin-film transistor is configured to control a corresponding data-line extension line at an alternate column to be in the high voltage state in the time period between displaying two adjacent images.

For example, in the array substrate provided in embodiments of the disclosure, a drain electrode of the third switching thin-film transistor is connected with the corresponding gate-line extension line at the alternate row, a gate electrode of the third switching thin-film transistor is configured to be inputted with a third voltage signal, and a source electrode of the third switching thin-film transistor is connected with the gate electrode of the third switching thin-film transistor; and a drain electrode of the fourth switching thin-film transistor is connected with the corresponding data-line extension line at the alternate column, a gate electrode of the fourth switching thin-film transistor is configured to be inputted with a fourth voltage signal, and a source electrode of the fourth switching thin-film transistor is connected with the gate electrode of the fourth switching thin-film transistor.

For example, in the array substrate provided in embodiments of the disclosure, the second control circuit further comprises a fifth switching thin-film transistor and a sixth switching thin-film transistors; the fifth switching thin-film transistor is configured to control a remaining gate-line extension line, which is not connected with the third switching thin-film transistor, to be in a low voltage state in the time period between displaying two adjacent images; the sixth switching thin-film transistor is configured to control a remaining data-line extension line, which is not connected with the fourth switching thin-film transistor, to be in the low voltage state in the time period between displaying two adjacent images.

For example, in the array substrate provided in embodiments of the disclosure, a drain electrode of the fifth switching thin-film transistor is connected with the remaining gate-line extension line which is not connected with the third switching thin-film transistor, a source electrode of the fifth switching thin-film transistor is configured to be inputted with a low voltage, a gate electrode of the fifth switching thin-film transistor is configured to be inputted with a fifth voltage signal; a drain electrode of the sixth switching thin-film transistor is connected with the remaining data-line extension line which is not connected with the fourth switching thin-film transistor, a source electrode of the sixth switching thin-film transistor is configured to be inputted with the low voltage, a gate electrode of the sixth switching thin-film transistor is configured to be inputted with a sixth voltage signal.

Embodiments of the disclosure provide a display device, comprising an array substrate and an opposed substrate opposite to each other, and a voltage control circuit. The array substrate is the array substrate described above; the voltage control circuit is configured to: input a first control signal to a control circuit of the array substrate in a time period of displaying an image, so as to connect the gate lines to the gate-line extension lines of the array substrate and connect the data lines to the data-line extension lines of the array substrate; input a second control signal to the control circuit of the array substrate in a time period between displaying two adjacent images, so as to disconnect the gate lines from the gate-line extension lines of the array substrate and disconnect the data lines from the data-line extension lines of the array substrate; and input a third control signal to the control circuit of the array substrate in the time period between displaying two adjacent images, so as to control two adjacent rows of the gate-line extension lines to have potential difference and control two adjacent columns of the data-line extension lines to have potential difference.

For example, in the display device provided in embodiments of the disclosure, the array substrate is the array substrate described above; a first voltage terminal of the voltage control circuit is connected to a gate electrode of a first switching thin-film transistor of the array substrate; and a second voltage terminal of the voltage control circuit is connected to a gate electrode of a second switching thin-film transistor of the array substrate.

For example, in the display device provided in embodiments of the disclosure, the first voltage terminal and the second voltage terminal are a same terminal, and the same terminal is respectively connected to the gate electrode of the first switching thin-film transistor and the gate electrode of the second switching thin-film transistor through a first control line.

For example, in the display device provided in embodiments of the disclosure, the array substrate is the array substrate described above; a third voltage terminal of the voltage control circuit is connected to a gate electrode of a third switching thin-film transistor of the array substrate; and a fourth voltage terminal of the voltage control circuit is connected to a gate electrode of a fourth switching thin-film transistor of the array substrate.

For example, in the display device provided in embodiments of the disclosure, the third voltage terminal and the fourth voltage terminal are a same terminal, and the same terminal is respectively connected to the gate electrode of the third switching thin-film transistor and the gate electrode of the fourth switching thin-film transistor through a second control line.

For example, in the display device provided in embodiments of the disclosure, the array substrate is the array substrate described above, a fifth voltage terminal of the voltage control circuit is connected to a gate electrode of a fifth switching thin-film transistor of the array substrate; and a sixth voltage terminal of the voltage control circuit is connected to a gate electrode of a sixth switching thin-film transistor of the array substrate.

For example, in the display device provided in embodiments of the disclosure, the fifth voltage terminal and the sixth voltage terminal are a same terminal, and the same terminal is respectively connected to the gate electrode of the fifth switching thin-film transistor and the gate electrode of the sixth switching thin-film transistor through a third control line.

For example, in the display device provided in embodiments of the disclosure, the array substrate is the array substrate described above. A black matrix is disposed on the array substrate or the opposed substrate, at least part of an orthographic projection of the black matrix on a substrate covers a peripheral area of the array substrate.

Embodiments of the disclosure provide a driving method of the display device described above, comprising: in a time period of displaying an image, connecting gate lines to gate-line extension lines and connecting data lines to data-line extension lines in response to a first control signal; and in a time period between displaying two adjacent images, disconnecting the gate lines from the gate-line extension lines and disconnecting the data lines from the data-line extension lines in response to a second control signal, and controlling two adjacent rows of the gate-line extension lines to have potential difference and controlling two adjacent columns of the data-line extension lines to have potential difference in response to a third second control signal.

For the array substrate, the display device and its driving method provided by embodiments of the disclosure, with the control of the control circuit, for example, voltages with opposite polarities can be inputted into, for example, two adjacent rows of gate-line extension lines and two adjacent columns of data-line extension lines, resulting in potential difference between two adjacent rows of gate-line extension lines and between two adjacent columns of data-line extension lines. Positive and negative charged ions at the peripheral area of the array substrate can be absorbed, so that the peripheral image residual issue can be effectively solved, and the display quality of the display device can be improved.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not (imitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

The size and shape of each structure in the drawing intend to illustrate the content of the disclosure, and not intend to represent the true scale.

A source electrode and a drain electrode of a switching thin-film transistor in every embodiment is symmetric, and therefore, the source electrode and the drain electrode are interchangeable. In embodiments of the disclosure, in order to distinguish the two electrodes of the transistor except the gate electrode, one electrode is referred to as the source electrode, and the other is referred to as the drain electrode.

Figure 1:
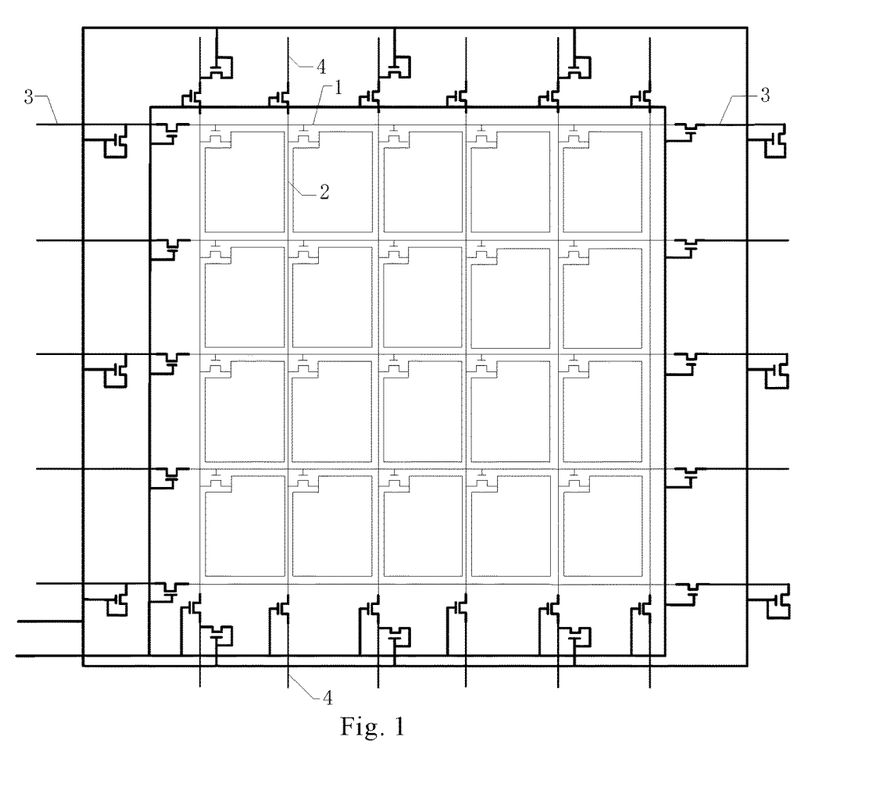
FIG. 1 is a first schematically structural view of an array substrate provided by an embodiment of the disclosure.

An embodiment of the disclosure provides an array substrate, as illustrated in FIG. 1, the array substrate includes a substrate; a plurality of gate lines 1 and a plurality of data lines 2 which intersect with each other and are disposed on the substrate; a control circuit; a plurality of gate-line extension lines 3, which are connected with at least part of the gate lines 1 through the control circuit; and a plurality of data-line extension lines 4, which are connected with at least part of the data lines 2 through the control circuit. The control circuit is configured to connect (i.e. electrically connect) the gate lines 1 with the gate-line extension lines 3 and to connect (i.e. electrically connect) the data lines 2 with the data-line extension lines 4 in a time period of displaying an image, and the control circuit is configured to disconnect (i.e. electrically disconnect) the gate lines 1 from the gate-line extension lines 3, to disconnect the data lines 2 from the data-line extension lines 4, to control at least part of the gate-line extension lines 3 to have potential difference, and to control at least part of the data-line extension lines 4 to have potential difference in a time period between displaying two adjacent images (i.e. a non-display time period after displaying a current image and before displaying a next image).

For example, the gate-line extension lines 3 are respectively provided at both ends of respective gate lines 1, and have a one-to-one correspondence with the gate lines 1, and the data-line extension lines 4 are respectively provided at both ends of respective data lines 2, and have a one-to-one correspondence with the data lines 2.

For example, the array substrate includes a display area and a peripheral area surrounding the display area. The gate lines 1 and the data lines 2 are disposed in the display area. The gate-line extension lines 3, the data-line extension lines 4 and the control circuit are disposed in the peripheral area.

For example, the control circuit is configured to disconnect the gate lines 1 from the gate-line extension lines 3, to disconnect the data lines 2 from the data-line extension lines 4, to control two adjacent rows of gate-line extension lines 3 to have potential difference, and to control two adjacent columns of data-line extension lines 4 to have potential difference in a time period between displaying two adjacent images.

It should be understood that the array substrate provided by the embodiments of the disclosure includes but not limited to the example illustrated in FIG. 1. For example, the gate-line extension lines can be provided at one end or both ends of part of the gate lines, the data-line extension lines can be provided at one end or both ends of part of the data lines. For example, the control circuit can also be configured to control part of the gate-line extension lines to have potential difference and to control part of the data-line extension lines to have potential difference in a time period between displaying two adjacent images. That is to say, the potential difference is not necessary to exist between every two adjacent rows of gate-line extension lines, and potential difference is not necessary to exist between every two adjacent columns of data-line extension lines.

For example, for the above array substrate provided by the embodiments of the disclosure, the gate-line extension lines, the data-line extension lines and the control circuit are provided at the peripheral area of the array substrate. After the display device is formed, the control circuit is configured to connect the gate lines to the gate-line extension lines and to connect the data lines to the data-line extension lines in the time period of displaying an image. A gate driver transmits gate scanning signals to the gate lines via the gate-line extension lines, a data driver transmits data signals to the data lines via the data-line extension lines, and thereby the display device can display the image normally. After the image being displayed normally, the control circuit is configured to disconnect the gate lines from the gate-line extension lines, to disconnect the data lines from the data-line extension lines, to control two adjacent rows of the gate-line extension lines to have potential difference, and to control two adjacent columns of data-line extension lines to have potential difference in a time period between displaying two adjacent images. Thus, the control circuit can input different voltages (for example, a high voltage and a low voltage, or voltages with opposite polarities) into two adjacent rows of the gate-line extension lines and to two adjacent columns of the data-line extension lines, resulting in potential difference between two adjacent rows of the gate-line extension lines and potential difference between two adjacent columns of the data-line extension lines of data line. Positive and negative charged ions at the peripheral area of the display device can be absorbed, and therefore the peripheral image residual issue can be effectively solved, and the display quality of the display device can be improved.

Figure 2:
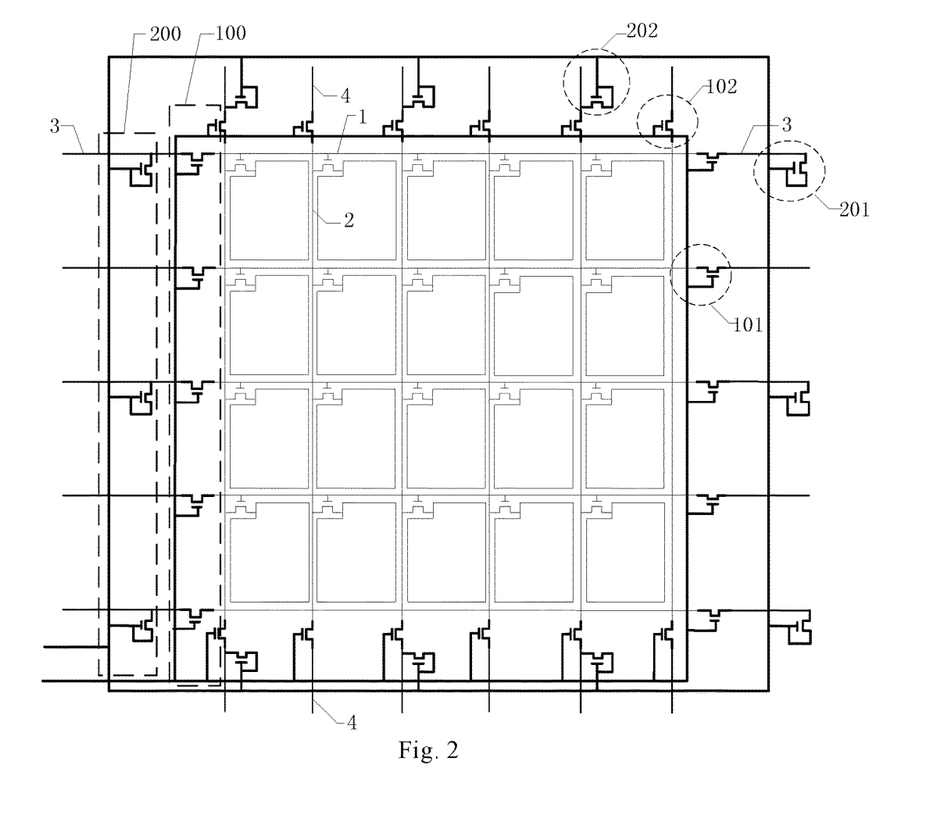
FIG. 2 is a second schematically structural view of an array substrate provided by an embodiment of the disclosure.

For example, for the above array substrate provided by the embodiment of the disclosure, as illustrated in FIG. 2, the control circuit comprises a first control circuit (a dashed box labeled with 100 is part of the first control circuit) and a second control circuit (a dashed box labeled with 200 is part of the second control circuit); the first control circuit is configured to connect the gate lines to the gate-line extension lines and to connect the data lines to the data-line extension lines in the time period of displaying an image; after the image being displayed normally, the first control circuit is configured to disconnect the gate lines from the gate-line extension lines, and to disconnect the data lines from the data-line extension lines in the time period between displaying two adjacent images; the second control circuit is configured to control two adjacent rows of the gate-line extension lines to have potential difference, and to control two adjacent columns of the data-line extension lines to have potential difference in the time period between displaying two adjacent images.

For example, for the above array substrate provided by the embodiment of the disclosure, as illustrated in FIG. 2, the first control circuit includes first switching thin-film transistors 101 and second switching thin-film transistors 102. Each first switching thin-film transistor 101 is configured to connect a gate line to a gate-line extension line in the time period of displaying an image, and after the image being displayed normally, the first switching thin-film transistor 101 is configured to disconnect the gate line from the gate-line extension line in the time period between displaying two adjacent images. Each second switching thin-film transistor 102 is configured to connect a data line to a data-line extension line in the time period of displaying an image, and to disconnect the data line from the data-line extension line in the time period between displaying two adjacent images.

For example, for the above array substrate provided by the embodiment of the disclosure, as illustrated in FIG. 2, a source electrode of the first switching thin-film transistor 101 is connected with the gate-line extension line 3, a drain electrode of the first switching thin-film transistor 101 is connected with the gate line 1, and a gate electrode of the first switching thin-film transistor 101 is configured to be inputted with a first voltage; a source electrode of the second switching thin-film transistor 102 is connected with the data-line extension line 4, a drain electrode of the second switching thin-film transistor 102 is connected with the data line 2, and a gate electrode of the second switching thin-film transistor 102 is configured to be inputted with a second voltage. Therefore, the first switching thin-film transistor 101 can control the connection and disconnection between the gate line 1 and the gate-line extension line 3; the second switching thin-film transistor 102 can control the connection and disconnection between the data line 2 and the data-line extension line 4. In the time period of displaying an image, the first switching thin-film transistor and the second switching thin-film transistor can maintain a switching-on state, i.e., maintain the connection between the gate line and the gate-line extension line and maintain the connection between the data line and the data-line extension line. After the image being displayed normally, in the time period between displaying two adjacent images, the first switching thin-film transistor and the second switching thin-film transistor can be turned off, i.e., the gate line and the gate-line extension line are disconnected, and the data line and the data-line extension line are disconnected. The gate-line extension lines and the data-line extension lines, which are not connected with the second control circuit, can respectively maintain not connected, which is equivalent to being in a low voltage state.

For example, for the above array substrate provided by the embodiment of the disclosure, as illustrated in FIG. 2, the second control circuit comprises third switching thin-film transistors 201 and fourth switching thin-film transistors 202. The third switching thin-film transistors 201 are configured to control gate-line extension lines at alternate rows in a high voltage state in the time period between displaying two adjacent images; the fourth switching thin-film transistors 202 are configured to control data-line extension lines at alternate columns in a high voltage state in the time period between displaying two adjacent images.

For example, in the embodiments of the disclosure, the low voltage can be, for example, 0V; the high voltage can be, for example, 5V.

For example, for the above array substrate provided by the embodiment of the disclosure, as illustrated in FIG. 2, a drain electrode of a third switching thin-film transistor 201 is connected with a gate-line extension line 3 at an alternate row, a gate electrode of the third switching thin-film transistor 201 is configured to be inputted with a third voltage, a source electrode of the third switching thin-film transistor 201 is connected with the gate electrode of the third switching thin-film transistor 201. A drain electrode of a fourth switching thin-film transistor 202 is connected with a data-line extension line at an alternate column, a gate electrode of the fourth switching thin-film transistor 202 is configured to input with a fourth voltage, a source electrode of the fourth switching thin-film transistor 202 is connected with the gate electrode of the fourth switching thin-film transistor 202. It should be understood that the gate-line extension lines at alternate rows can be gate-line extension lines at odd numbered rows, or can be gate-line extension lines at even numbered rows; similarly, the data-line extension lines at alternate columns can be data-line extension lines at odd numbered columns, or can be data-line extension lines at even numbered columns. Therefore, an output voltage state of the gate-line extension lines at odd numbered/even numbered rows and an output voltage state of the data-line extension lines at odd numbered/even numbered columns can be respectively controlled through the third switching thin-film transistor and the fourth switching thin-film transistor. In the time period between displaying two adjacent images, the gate-line extension lines connected with the third switching thin-film transistors and the data-line extension lines connected with the fourth switching thin-film transistors can be respectively maintained in a high voltage state.

Figure 3:
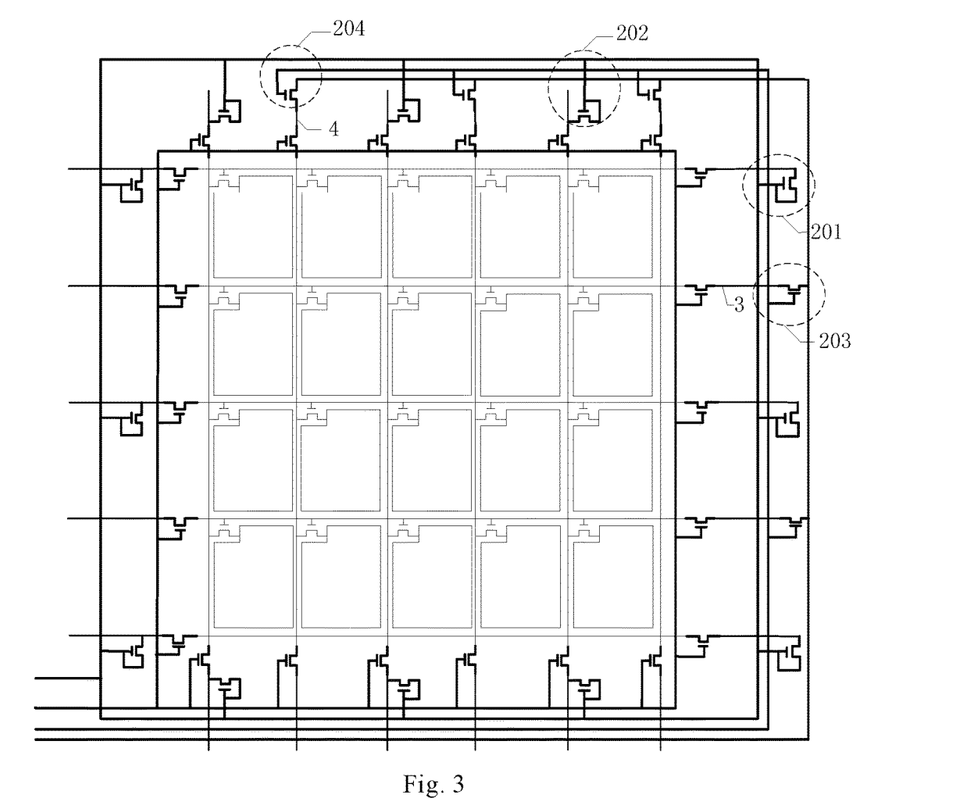
FIG. 3 is a third schematically structural view of an array substrate provided by an embodiment of the disclosure.

For example, for the above array substrate provided by the embodiments of the disclosure, as illustrated in FIG. 3, the second control circuit can further comprises fifth switching thin-film transistors 203 and sixth switching thin-film transistors 204. The fifth switching thin-film transistors 203 are configured to control remaining gate-line extension lines, which are not connected with the third switching thin-film transistors 201, to be in a low voltage state in the time period between displaying two adjacent images; the sixth switching thin-film transistors 204 are configured to control remaining data-line extension lines, which are not connected with the fourth switching thin-film transistors 202, to be in a low voltage state in the time period between displaying two adjacent images.

For example, for the above array substrate provided by the embodiments of the disclosure, as illustrated in FIG. 3, a drain electrode of a fifth switching thin-film transistor 203 is connected with a remaining gate-line extension line 3 which is not connected with any third switching thin-film transistor 201, a source electrode of the fifth switching thin-film transistor 203 is configured to be inputted with a low voltage, a gate electrode of the fifth switching thin-film transistor 203 is configured to be inputted with a fifth voltage. A drain electrode of a sixth switching thin-film transistor 204 is connected with a remaining data-line extension line 4 which is not connected with any fourth switching thin-film transistor 202, a source electrode of the sixth switching thin-film transistor 204 is configured to be inputted with a low voltage, a gate electrode of the sixth switching thin-film transistor 204 is configured to be inputted with a sixth voltage. It should be understood that the remaining gate-line extension lines, which are not connected with the third switching thin-film transistors, are the gate-line extension lines at even numbered rows in a case that the drain electrodes of the third switching thin-film transistors are connected with the gate-line extension lines at odd numbered rows; or, the remaining gate-line extension lines, which are not connected with the third switching thin-film transistors, are the gate-line extension lines at odd numbered rows in a case that the drain electrodes of the third switching thin-film transistors are connected with the gate-line extension lines at even numbered rows. Similarly, the remaining data-line extension lines, which are not connected with the fourth switching thin-film transistors, are data-line extension lines at even numbered columns in a case that the drain electrodes of the fourth switching thin-film transistors are connected with data-line extension lines at odd numbered columns; or, the remaining data-line extension lines, which are not connected with the fourth switching thin-film transistors, are data-line extension lines at odd numbered columns in a case that the drain electrodes of the fourth switching thin-film transistors are connected with data-line extension lines at even numbered columns. Therefore, in the time period between displaying two adjacent images, the first switching thin-film transistors and the second switching thin-film transistors can be turned off, in the meantime, the third switching thin-film transistors, the fourth switching thin-film transistors, the fifth switching thin-film transistors, and the sixth switching thin-film transistors can be turned on, the gate-line extension lines connected with the fifth switching thin-film transistors and the data-line extension lines connected with the sixth switching thin-film transistors can be configured in a low voltage state. An ion absorption capability of the electric field formed between two adjacent rows of the gate-line extension lines and formed between two adjacent columns of the data-line extension lines can be improved, and the capability to ameliorate the peripheral image residual issue can be further improved.

It should be understood that, for example, the first switching thin-film transistors, the second switching thin-film transistors, the third switching thin-film transistors, the fourth switching thin-film transistors, the fifth switching thin-film transistors, and the sixth switching thin-film transistors can be formed in a same process with the switching thin-film transistors in the display area, i.e., the above switching thin-film transistors can be formed at the same time, thereby the manufacturing process can be simplified, and the cost can be reduced.

For example, the array substrate provided by the embodiments of the disclosure further comprises an insulation layer, a passivation layer, an alignment film and other films and layers, and a common electrode line or the like can also be disposed on the array substrate, the concrete structures can be implemented with various ways, which will not be limited herein.

Figure 4:
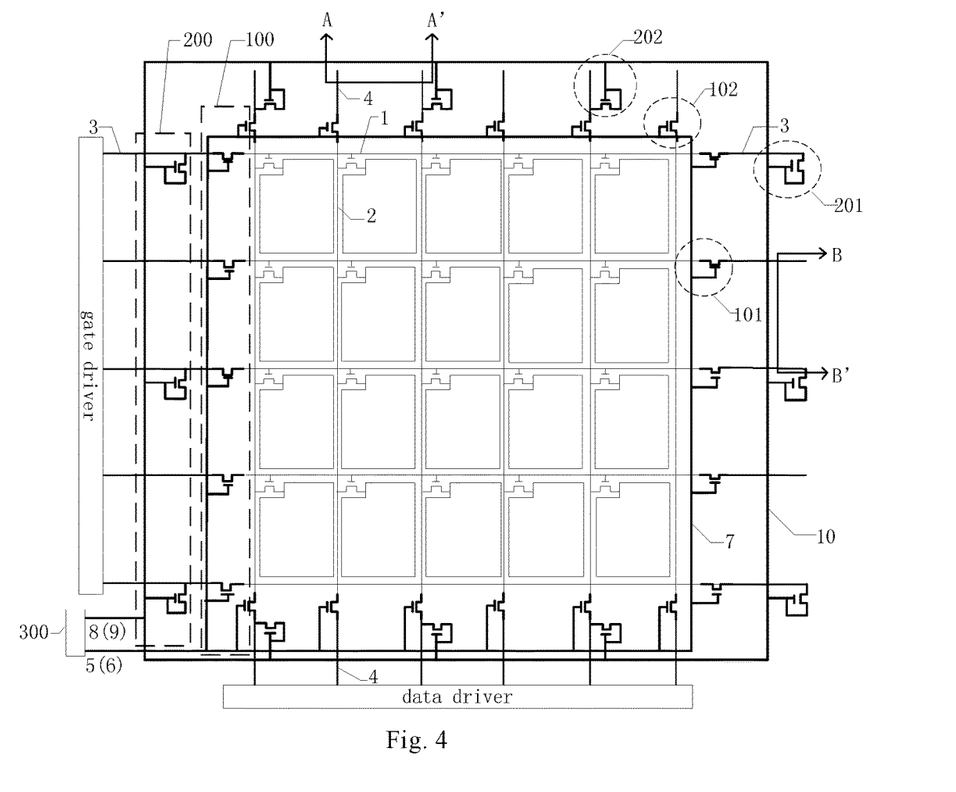
FIG. 4 is a first schematically structural view of a display device provided by an embodiment of the disclosure.

Based on the same invention concept, the embodiments of the discloure further provide a display device, as illustrated in FIG. 4. The display device comprises any one of the above array substrates, an opposed substrate opposite to the array substrate, and a voltage control circuit 300. The implementation of the display device may be understood with reference to the above embodiments of the array substrate; no further description will be given for the repeated contents.

The display device can be a display panel. The voltage control circuit 300 is configured to input a first control signal to the control circuit of the array substrate in a time period of displaying an image, so as to connect the gate lines 1 to the gate-line extension lines 3 of the array substrate and connect the data lines 2 to the data-line extension lines 4 of the array substrate, and so the display device can display images normally. After the image being displayed, in a time period between displaying two adjacent images, the voltage control circuit 300 is configured to input a second control signal to the control circuit of the array substrate, so as to disconnect the gate lines 1 from the gate-line extension lines 3 of the array substrate and disconnect the data lines 2 from the data-line extension lines 4 of the array substrate; and the voltage control circuit 300 is configured to input a third control signal to the control circuit of the array substrate, so as to cause two each adjacent rows of the gate-line extension lines 3 to have potential difference and to cause each two adjacent columns of the data-line extension lines 4 to have potential difference.

For example, for the display device provided by the embodiment of the disclosure, as illustrated in FIG. 4, a first voltage terminal 5 of the voltage control circuit 300 is connected to a gate electrode of each first switching thin-film transistor 101 of the array substrate; the first voltage terminal 5 outputs a first voltage signal, and the first voltage signal is configured for turning on the first switching thin-film transistors 101 in the time period of displaying an image, so as to connect the gate lines to the gate-line extension lines. After the image being normally displayed, in the time period between displaying two adjacent images, the first voltage signal is configured for turning off the first switching thin-film transistors 101, so as to disconnect the gate lines from the gate-line extension lines. A second voltage terminal 6 of the voltage control circuit 300 is connected to a gate electrode of each second switching thin-film transistor 102 of the array substrate. The second voltage terminal 6 outputs a second voltage signal, and the second voltage signal is configured for turning on the second switching thin-film transistors 102 in the time period of displaying an image, so as to connect the data lines to the data-line extension lines; after the image being normally displayed, in the time period between displaying two adjacent images, the second voltage signal is configured for turning off the second switching thin-film transistors 102, so as to disconnect the data lines from the data-line extension lines.

For example, for the array substrate provided by the embodiments of the disclosure, in order to simplify the wiring design in the peripheral area, as illustrated in FIG. 4, the first voltage terminal 5 and the second voltage terminal 6 can be a same terminal, and the same terminal (i.e., the first voltage terminal and the second voltage terminal) can be respectively connected to the gate electrodes of the first switching thin-film transistors 101 and the gate electrodes of the second switching thin-film transistors 102 through a first control line 7. The first control line 7 can transmit the first control signal in the time period of displaying an image, and can transmit the second control signal in the time period between displaying two adjacent images. It should be understood that, for example, the first control line 7 and the gate lines 1 can be disposed in a same layer and can comprise the same material, that is, the pattern of the first control line and the pattern of the gate lines can be formed in a same patterning process; or the first control line 7 and the data lines 2 can be disposed in a same layer and can comprise the same material, that is, the pattern of the first control line and the pattern of the data lines can be formed in a same patterning process; therefore, the manufacturing process and the cost can be reduced.

For example, for the display device provided by the embodiments of the disclosure, as illustrated in FIG. 4, a third voltage terminal 8 of the voltage control circuit 300 is connected to a gate electrode of each third switching thin-film transistor 201 of the array substrate. The third voltage terminal 8 outputs a third voltage signal, and the third voltage signal is configured for turning on the third switching thin-film transistors 201 in the time period between displaying two adjacent images, so as to make the gate-line extension lines at alternate rows to be in a high voltage state. A fourth voltage terminal 9 of the voltage control circuit 300 is connected to a gate electrode of each fourth switching thin-film transistor 202 of the array substrate; the fourth voltage terminal 9 outputs a fourth voltage signal, and the fourth voltage signal is configured for turning on the fourth switching thin-film transistors 202 in the time period between displaying two adjacent images, so as to make the data-line extension lines at alternate columns to be in a high voltage state.

For example, for the array substrate provided by the embodiments of the disclosure, in order to simplify the wiring design in the peripheral area, as illustrated in FIG. 4, the third voltage terminal 8 and the fourth voltage terminal 9 can be a same terminal, and the same terminal (i.e., the third voltage terminal 8 and the fourth voltage terminal 9) can be respectively connected to the gate electrodes of the third switching thin-film transistors 201 and the gate electrodes of the fourth switching thin-film transistors 202 through a second control line 10. The second control line 10 can transmit the third control signal in the time period between displaying two adjacent images. It should be understood that, for example, the second control line 10 and the gate lines 1 can be disposed in a same layer and can comprise the same material, that is, the pattern of the second control line and the pattern of the gate lines can be formed in a same patterning process; or the second control line 10 and the data lines 2 can be disposed in a same layer and can comprise the same material, that is, the pattern of the second control line and the pattern of the data lines can be formed in a same patterning process; therefore, the manufacturing process and the cost can be reduced.

Figure 5:
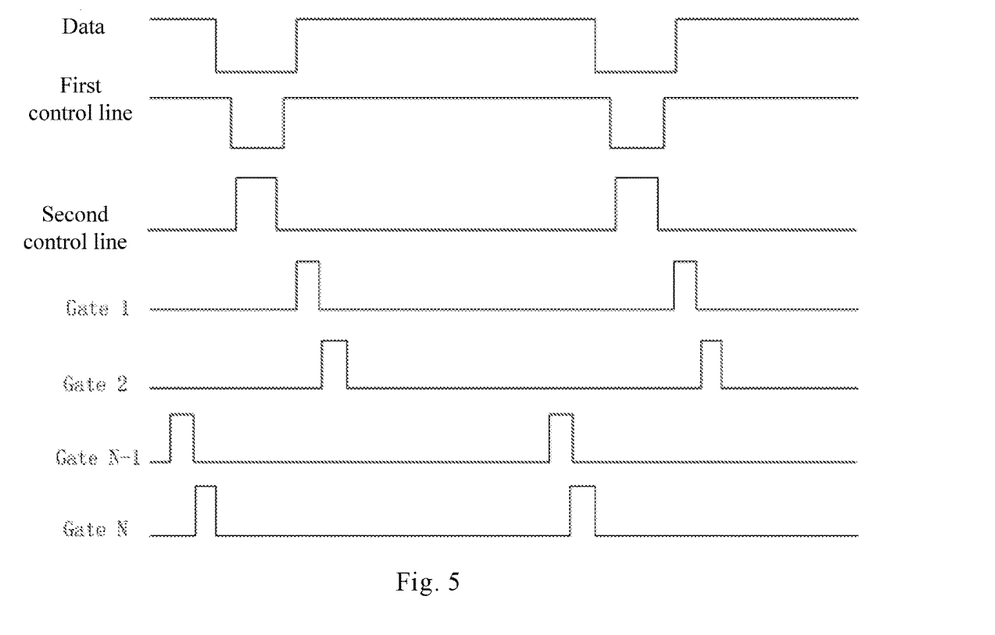
FIG. 5 is a working sequence chart of the display device in FIG. 4.
Figure 6A:
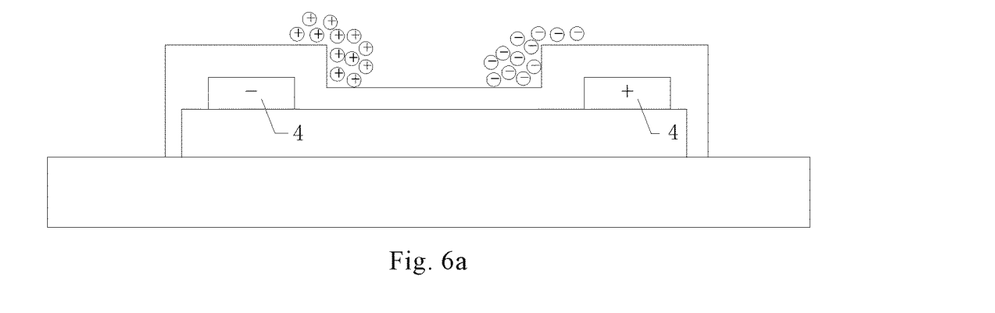
FIG. 6a is a schematically structural cross-sectional view of the display device provided by an embodiment of the disclosure taken along an A-A' line in FIG. 4 after ions being absorbed.
Figure 6B:
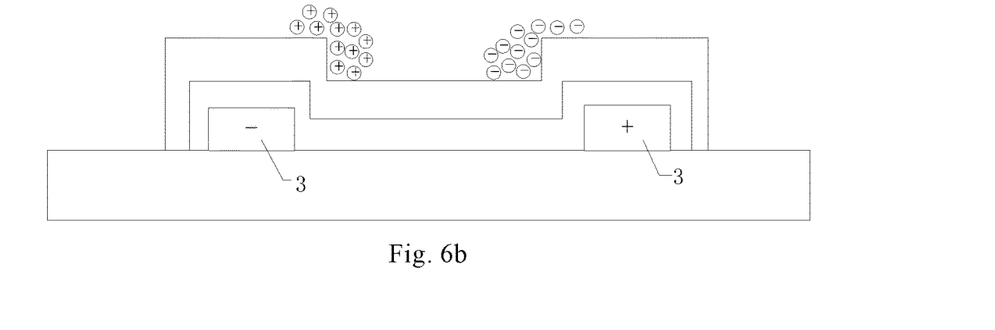
FIG. 6b is a schematically structural cross-sectional view of the display device provided by an embodiment of the disclosure taken along a B-B' line in FIG. 4 after ions being absorbed.

For example, as illustrated in FIG. 5, in the time period of displaying an image, the first control line transmits a high voltage signal, and the first switching thin-film transistors and the second switching thin-film transistors are maintained in a turning-on state, i.e., maintaining the connection between the gate lines and the gate-line extension lines and maintaining the connection between the data lines and the data-line extension lines, and thus, the display device can display images normally with the gate driver and the data driver. In the time period between displaying two adjacent images, the first control line transmits a low voltage signal, the first switching thin-film transistors and the second switching thin-film transistors are turned off, and the gate lines and the data lines in the display area will not be influenced by the operation on the gate-line extension lines and the data-line extension lines. After the first control line transmits the low voltage signal, the second control line transmits a high voltage signal, and the third switching thin-film transistors and the fourth switching thin-film transistors are turned on. By taking FIG. 4 as an example, the gate-line extension lines at odd numbered rows and the data-line extension lines at odd numbered columns are in a high voltage state, the gate-line extension lines at even numbered rows and the data-line extension lines at even numbered columns are suspended, and an electric field is formed between adjacent rows of the gate-line extension lines and adjacent columns of the data-line extension lines. As illustrated in FIG. 6a and FIG. 6b, the positive and negative charged ions in the display device can be absorbed to the peripheral area, and the peripheral image residual issue can be effectively solved.

Figure 7:
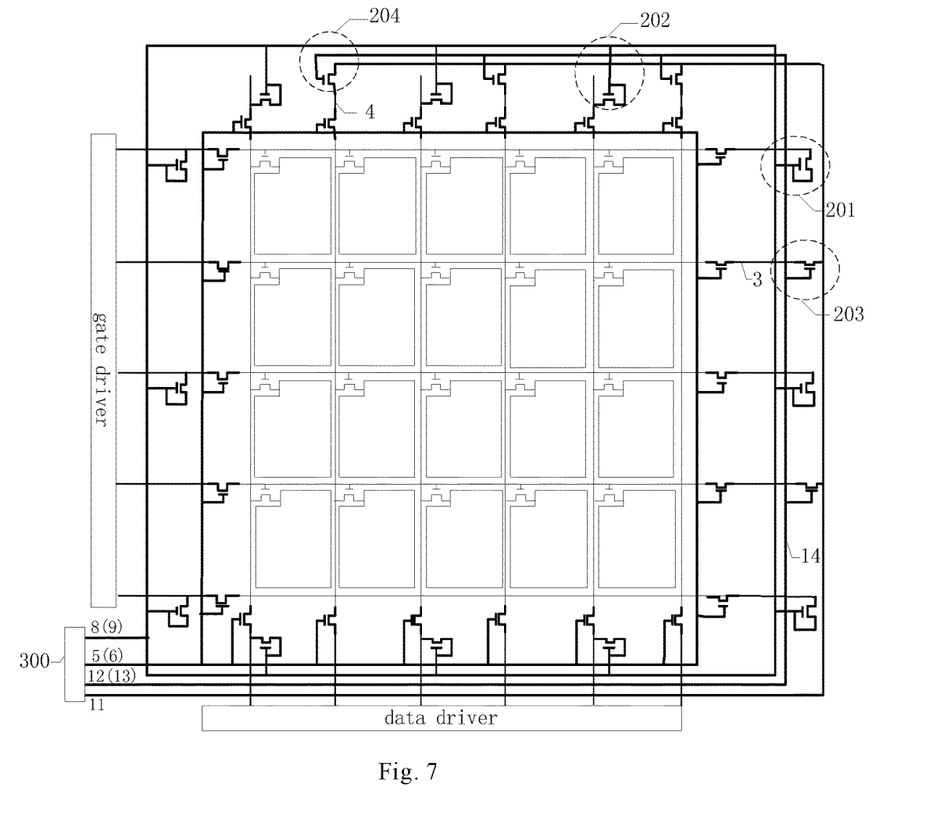
FIG. 7 is a second schematically structural view of a display device provided by an embodiment of the disclosure.

For example, for the above display device provided by the embodiment of the disclosure, as illustrated in FIG. 7, a fifth voltage terminal 12 of the voltage control circuit 300 is connected to a gate electrode of each fifth switching thin-film transistor 203 of the array substrate. The fifth voltage terminal 12 outputs a fifth voltage signal, and the fifth voltage signal is configured for turning on the fifth switching thin-film transistors 203 in the time period between displaying two adjacent images. A sixth voltage terminal 13 of the voltage control circuit 300 is connected to a gate electrode of each sixth switching thin-film transistor 204 of the array substrate. The sixth voltage terminal 13 outputs a sixth voltage signal, and the sixth voltage signal is configured for turning on the sixth switching thin-film transistors 204 in the time period between displaying two adjacent images.

It should be understood that, a source electrode of each fifth switching thin-film transistor 203 is configured to be inputted with a low voltage and a source electrode of each sixth switching thin-film transistor 204 is configured to be inputted with a low voltage, and therefore, a low voltage terminal 11 of the voltage control circuit can be connected with the source electrode of each fifth switching thin-film transistor 203 and the source electrode of each sixth switching thin-film transistor 204. The low voltage terminal outputs a low voltage, and the remaining gate-line extension lines, which are not connected with the third switching thin-film transistors 201, are in a low voltage state, and the remaining data-line extension lines, which are not connected with the fourth switching thin-film transistors 202, are in a low voltage state.

For example, for the above array substrate provided by the embodiments of the disclosure, in order to simplify the wiring design in the peripheral area, as illustrated in FIG. 7, the fifth voltage terminal 12 and the sixth voltage terminal 13 can be a same terminal, and the same terminal (i.e., the fifth voltage terminal 12 and the sixth voltage terminal 13) can be respectively connected to the gate electrode of each fifth switching thin-film transistor 203 and the gate electrode of each sixth switching thin-film transistor 204 through a third control line 14. The third control line can transmit the third control signal in the time period between displaying two adjacent images. It should be understood that, for example, the third control line 14 and the gate lines 1 can be disposed in a same layer and can comprise the same material, that is, the pattern of the third control line and the pattern of the gate lines can be formed in a same patterning process; or the third control line 14 and the data lines 2 can be disposed in a same layer and can comprise the same material, that is, the pattern of the third control line and the pattern of the data lines can be formed in a same patterning process; and therefore, the manufacturing process and the cost can be reduced.

Figure 8:
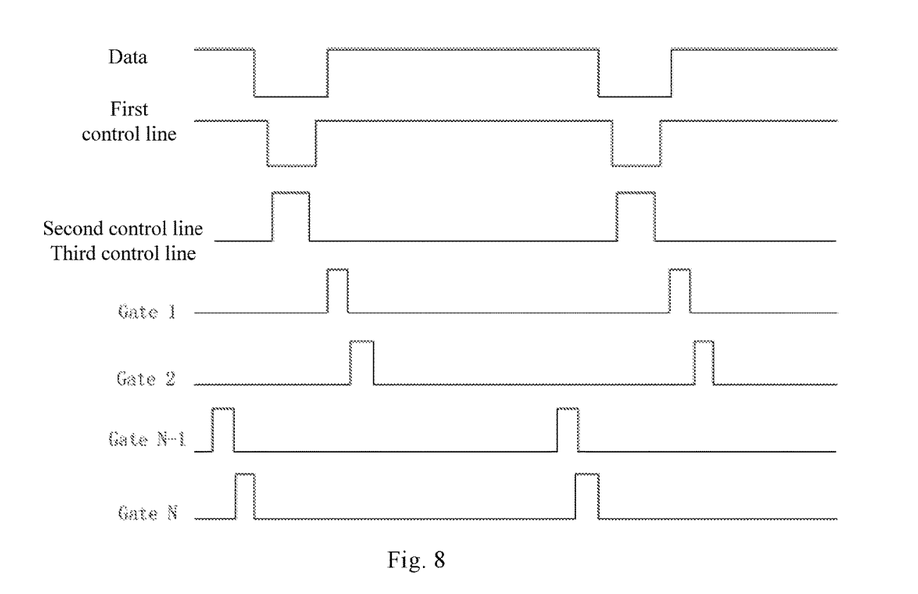
FIG. 8 is a working sequence chart of the display device of FIG. 7.

For example, as illustrated in FIG. 8, in the time period between displaying two adjacent images, the first control line transmits a low voltage signal. After the first switching thin-film transistors and the second switching thin-film transistors are turned off, both the second control line and the third control line transmits a high voltage signal. By taking FIG. 7 as an example, the gate-line extension lines at odd numbered rows and the data-line extension lines at odd numbered columns are inputted with a high voltage. Because the third switching thin-film transistors, the fourth switching thin-film transistors, the fifth switching thin-film transistors and the sixth switching thin-film transistors are turned on simultaneously, the low voltage signal in the low voltage control line connected with the low voltage terminal is loaded into the gate-line extension lines at even numbered rows and the data-line extension lines at even numbered columns. Thus, an electric field is formed between adjacent rows of gate-line extension lines and adjacent columns of data-line extension lines, the positive and negative charged ions in the display device can be absorbed to the peripheral area, and the peripheral image residual issue can be further ameliorated substantially.

For example, for the above display device provided by the embodiments of the disclosure, in order to block light, a black matrix is disposed on the array substrate or the opposed substrate, and at least part of an orthographic projection of the black matrix on a substrate covers a peripheral area of the array substrate, such that the peripheral area of the array substrate can be covered, and the peripheral area can be configured for not displaying images.

Those skilled in the art can appreciate other components of the display device which are not described herein and should not be taken as limitation to the present disclosure.

Based on the same inventive concept, an embodiment of the disclosure further provides a driving method for the above display device provided by the embodiments of the disclosure. Because the method uses a similar principle to solve problems as the above display device, the implementation of the method can be understood with reference to the implementation of the display device. No further description will be given herein for the repeated content.

Figure 9:
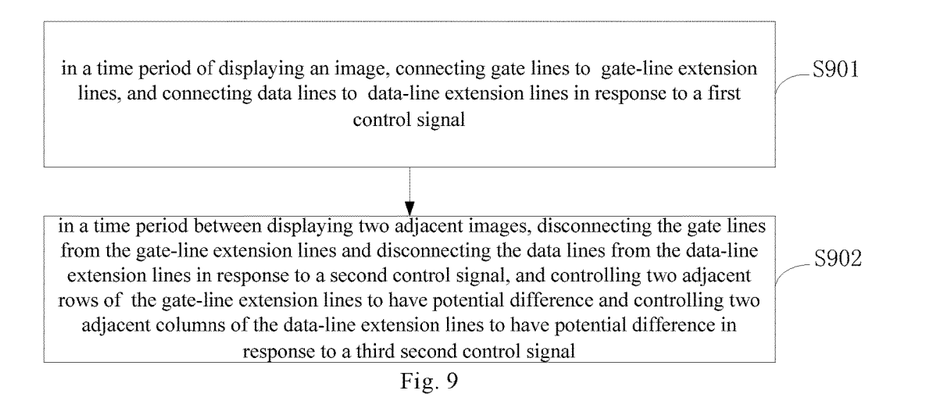
FIG. 9 is a flow chart of a driving method of a display device provided by an embodiment of the disclosure.

For example, a driving method for the display device provided by the embodiments of the disclosure, as illustrated in FIG. 9, comprises the following steps:

S901: in a time period of displaying an image, connecting gate lines to gate-line extension lines, and connecting data lines to data-line extension lines in response to a first control signal;

S902: in a time period between displaying two adjacent images, disconnecting the gate lines from the gate-line extension lines and disconnecting the data lines from the data-line extension lines in response to a second control signal, and controlling two adjacent rows of the gate-line extension lines to have potential difference and controlling two adjacent columns of the data-line extension lines to have potential difference in response to a third second control signal.

Embodiments of the disclosure provide an array substrate, a display device and a driving method thereof. The array substrate comprises: a substrate; a plurality of gate lines and a plurality of data lines, the plurality of gate lines and the plurality of data lines intersecting with each other and disposed on the substrate; a control circuit; a plurality of gate-line extension lines, which are connected with at least part of the gate lines through the control circuit; and a plurality of data-line extension lines, which are connected with at least part of the data lines through the control circuit. The control circuit is configured to connect the gate lines to the gate-line extension lines, and to connect the data lines to the data-line extension lines in a time period of displaying an image, and configured to disconnect the gate lines from the gate-line extension lines, to disconnect the data lines from the data-line extension lines, to control at least part of the gate-line extension lines to have potential difference, and to control at least part of the data-line extension lines to have potential difference in a time period between displaying two adjacent images. With the control of the control circuit, different voltages (for example, voltages with opposite polarities) can be inputted into, for example, each two adjacent rows of the gate-line extension lines and each two adjacent columns of the data-line extension lines, resulting in the potential difference between two adjacent rows of the gate-line extension lines and the potential difference between two adjacent columns of the data-line extension lines. The positive and negative charged ions at the peripheral area of the display device can be absorbed, so that the peripheral image residual issue can be effectively solved, and the display quality of the display device can be improved.

It is apparent that the presented disclosure can be modified by those skilled in the art without departure from the spirit and scope of the disclosure, if the above modification of the presented disclosure belongs to the scope of the claims of the presented disclosure and its equivalent technologies, the presented disclosure is intended to include the above modifications.

What are described above is related to the illustrative embodiments of the disclosure only and not (imitative to the scope of the disclosure; the scopes of the disclosure are defined by the accompanying claims.

The application claims priority to the Chinese patent application No. 201511031927.2, filed Dec. 31, 2015, the entire disclosure of which is incorporated herein by reference as part of the present application.

What is claimed is:

1. An array substrate, comprising:
   a substrate;
   a plurality of gate lines and a plurality of data lines, the plurality of gate lines and a plurality of data lines intersecting with each other and disposed on the substrate;
   a control circuit;
   a plurality of gate-line extension lines, which are connected with at least part of the gate lines through the control circuit; and
   a plurality of data-line extension lines, which are connected with at least part of the data lines through the control circuit;
   wherein the control circuit is configured to connect the at least part of the gate lines to the gate-line extension lines and connect the at least part of the data lines to the data-line extension lines in a time period of displaying an image, and the control circuit is configured to disconnect the at least part of the gate lines from the gate-line extension lines, disconnect the at least part of the data lines from the data-line extension lines, control at least part of the gate-line extension lines to have potential difference, and control at least part of the data-line extension lines to have potential difference in a time period between displaying two adjacent images.

2. The array substrate according to claim 1, wherein the gate-line extension lines are respectively provided at two ends of respective gate lines and have a one-to-one correspondence with the gate lines, and the data-line extension lines are respectively provided at two ends of respective data lines and have a one-to-one correspondence with the data lines.

3. The array substrate according to claim 1, comprising: a display area and a peripheral area surrounding the display area, wherein the gate lines and the data lines are disposed in the display area, the gate-line extension lines, the data-line extension lines and the control circuit are disposed in the peripheral area.

4. The array substrate according to claim 1, wherein the control circuit is configured to disconnect the at least part of the gate lines from the gate-line extension lines, disconnect the at least part of the data lines from the data-line extension lines, control two adjacent rows of the gate-line extension lines to have potential difference, and control two adjacent columns of the data-line extension lines to have potential difference in the time period between displaying two adjacent images.

5. The array substrate according to claim 4, wherein the control circuit comprises a first control circuit and a second control circuit;
   wherein the first control circuit is configured to connect the at least part of the gate lines to the gate-line extension lines and connect the at leash part of the data lines to the data-line extension lines in the time period of displaying an image, and configured to disconnect the at least part of the gate lines from the gate-line extension lines and disconnect the at least part of the data lines from the data-line extension lines in the time period between displaying two adjacent images;
   wherein the second control circuit is configured to control the adjacent rows of the gate-line extension lines to have potential difference and control the two adjacent columns of the data-line extension lines to have potential difference in the time period between displaying two adjacent images.

6. The array substrate according to claim 5, wherein the first control circuit comprises a first switching thin-film transistor and a second switching thin-film transistor;
   wherein the first switching thin-film transistor is configured to connect a corresponding gate line to a corresponding gate-line extension line in the time period of displaying an image, and disconnect the corresponding gate line from the corresponding gate-line extension line in the time period between displaying two adjacent images; and
   wherein the second switching thin-film transistor is configured to connect a corresponding data line to a corresponding data-line extension line in the time period of displaying an image, and disconnect the corresponding data line from the corresponding data-line extension line in the time period between displaying two adjacent images.

7. The array substrate according to claim 6, wherein:
   a source electrode of the first switching thin-film transistor is connected with the corresponding gate-line extension line, a drain electrode of the first switching thin-film transistor is connected with the corresponding gate line, and a gate electrode of the first switching thin-film transistor is configured to be inputted with a first voltage signal;
   a source electrode of the second switching thin-film transistor is connected with the corresponding data-line extension line, a drain electrode of the second switching thin-film transistor is connected with the corresponding data line, and a gate electrode of the second switching thin-film transistor is configured to be inputted with a second voltage signal.

8. The array substrate according to claim 5, wherein the second control circuit comprises a third switching thin-film transistor and a fourth switching thin-film transistor;
   wherein the third switching thin-film transistor is configured to control a corresponding gate-line extension line at an alternate row to be in a high voltage state in the time period between displaying two adjacent images; and wherein the fourth switching thin-film transistor is configured to control a corresponding data-line extension line at an alternate column to be in the high voltage state in the time period between displaying two adjacent images.

9. The array substrate according to claim 8, wherein:
a drain electrode of the third switching thin-film transistor is connected with the corresponding gate-line extension line at the alternate row, a gate electrode of the third switching thin-film transistor is configured to be inputted with a third voltage signal, and a source electrode of the third switching thin-film transistor is connected with the gate electrode of the third switching thin-film transistor; and
a drain electrode of the fourth switching thin-film transistor is connected with the corresponding data-line extension line at the alternate column, a gate electrode of the fourth switching thin-film transistor is configured to be inputted with a fourth voltage signal, and a source electrode of the fourth switching thin-film transistor is connected with the gate electrode of the fourth switching thin-film transistor.

10. The array substrate according to claim 8, wherein the second control circuit further comprises a fifth switching thin-film transistor and a sixth switching thin-film transistors;
wherein the fifth switching thin-film transistor is configured to control a remaining gate-line extension line, which is not connected with the third switching thin-film transistor, to be in a low voltage state in the time period between displaying two adjacent images;
wherein the sixth switching thin-film transistor is configured to control a remaining data-line extension line, which is not connected with the fourth switching thin-film transistor, to be in the low voltage state in the time period between displaying two adjacent images.

11. The array substrate according to claim 10, wherein a drain electrode of the fifth switching thin-film transistor is connected with the remaining gate-line extension line which is not connected with the third switching thin-film transistor, a source electrode of the fifth switching thin-film transistor is configured to be inputted with a low voltage, a gate electrode of the fifth switching thin-film transistor is configured to be inputted with a fifth voltage signal;
a drain electrode of the sixth switching thin-film transistor is connected with the remaining data-line extension line which is not connected with the fourth switching thin-film transistor, a source electrode of the sixth switching thin-film transistor is configured to be inputted with the low voltage, a gate electrode of the sixth switching thin-film transistor is configured to be inputted with a sixth voltage signal.

12. A display device, comprising an array substrate and an opposed substrate opposite to each other, and a voltage control circuit, wherein:
the array substrate is the array substrate according to claim 1;
the voltage control circuit is configured to:
input a first control signal to a control circuit of the array substrate in a time period of displaying an image, so as to connect the at least part of the gate lines to the gate-line extension lines of the array substrate and connect the at least part of the data lines to the data-line extension lines of the array substrate;
input a second control signal to the control circuit of the array substrate in a time period between displaying two adjacent images, so as to disconnect the at least part of the gate lines from the gate-line extension lines of the array substrate and disconnect the at least part of data lines from the data-line extension lines of the array substrate; and
input a third control signal to the control circuit of the array substrate in the time period between displaying two adjacent images, so as to control two adjacent rows of the gate-line extension lines to have potential difference and control two adjacent columns of the data-line extension lines to have potential difference.

13. The display device according to claim 12, wherein:
a first voltage terminal of the voltage control circuit is connected to a gate electrode of a first switching thin-film transistor of the array substrate; and
a second voltage terminal of the voltage control circuit is connected to a gate electrode of a second switching thin-film transistor of the array substrate.

14. The display device according to claim 13, wherein:
the first voltage terminal and the second voltage terminal are a same terminal, and the same terminal is respectively connected to the gate electrode of the first switching thin-film transistor and the gate electrode of the second switching thin-film transistor through a first control line.

15. The display device according to claim 12, wherein:
a third voltage terminal of the voltage control circuit is connected to a gate electrode of a third switching thin-film transistor of the array substrate; and
a fourth voltage terminal of the voltage control circuit is connected to a gate electrode of a fourth switching thin-film transistor of the array substrate.

16. The display device according to claim 15, wherein:
the third voltage terminal and the fourth voltage terminal are a same terminal, and the same terminal is respectively connected to the gate electrode of the third switching thin-film transistor and the gate electrode of the fourth switching thin-film transistor through a second control line.

17. The display device according to claim 12, wherein:
a fifth voltage terminal of the voltage control circuit is connected to a gate electrode of a fifth switching thin-film transistor of the array substrate; and
a sixth voltage terminal of the voltage control circuit is connected to a gate electrode of a sixth switching thin-film transistor of the array substrate.

18. The display device according to claim 17, wherein:
the fifth voltage terminal and the sixth voltage terminal are a same terminal, and the same terminal is respectively connected to the gate electrode of the fifth switching thin-film transistor and the gate electrode of the sixth switching thin-film transistor through a third control line.

19. The display device according to claim 12, wherein:
a black matrix is disposed on the array substrate or the opposed substrate, at least part of an orthographic projection of the black matrix on a substrate covers a peripheral area of the array substrate.

* * * * *